Figure 3:
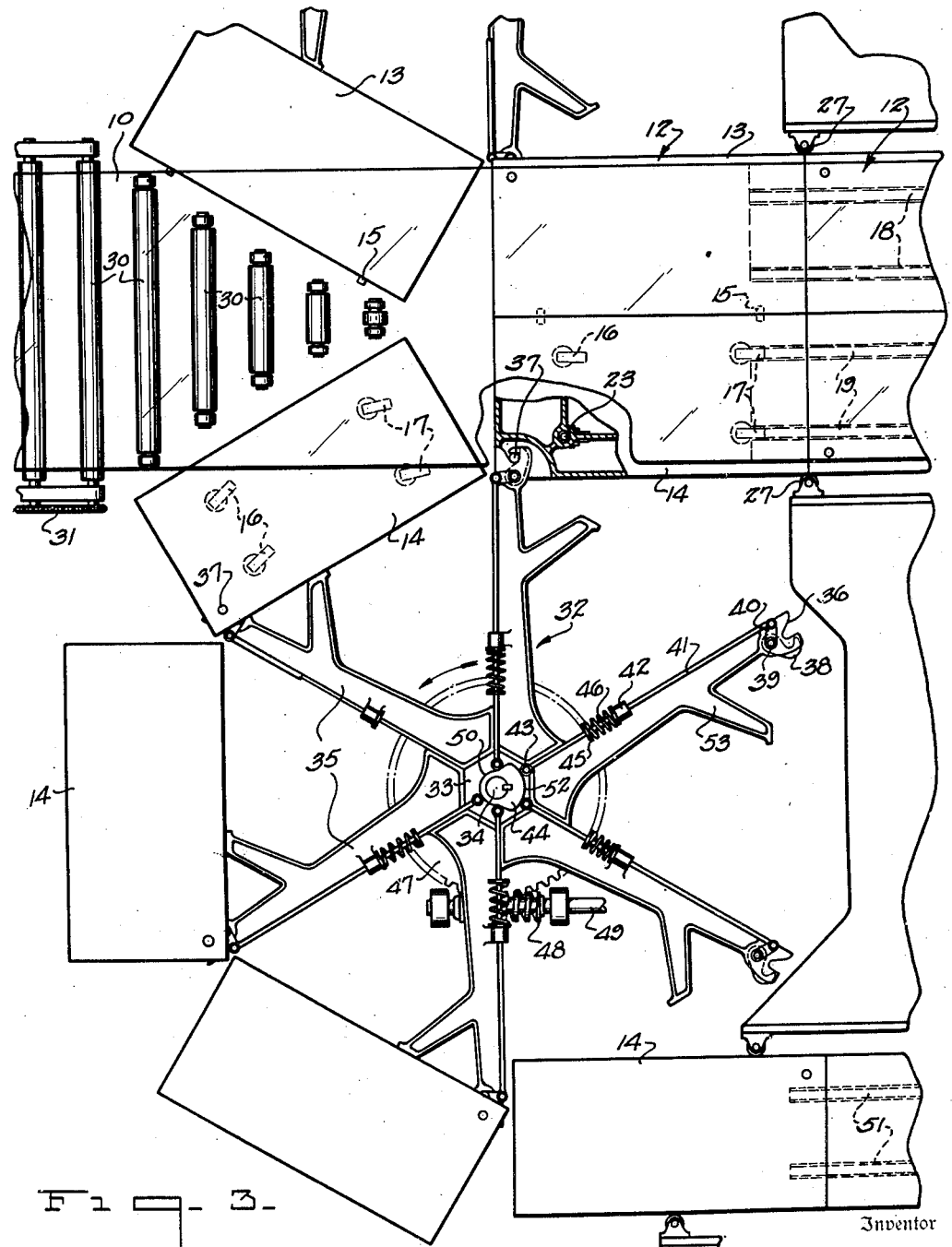

April 18, 1933.   C. CONE   1,904,978
APPARATUS FOR THE MANUFACTURE OF SHEET GLASS
Filed Sept. 10, 1931   3 Sheets-Sheet 1
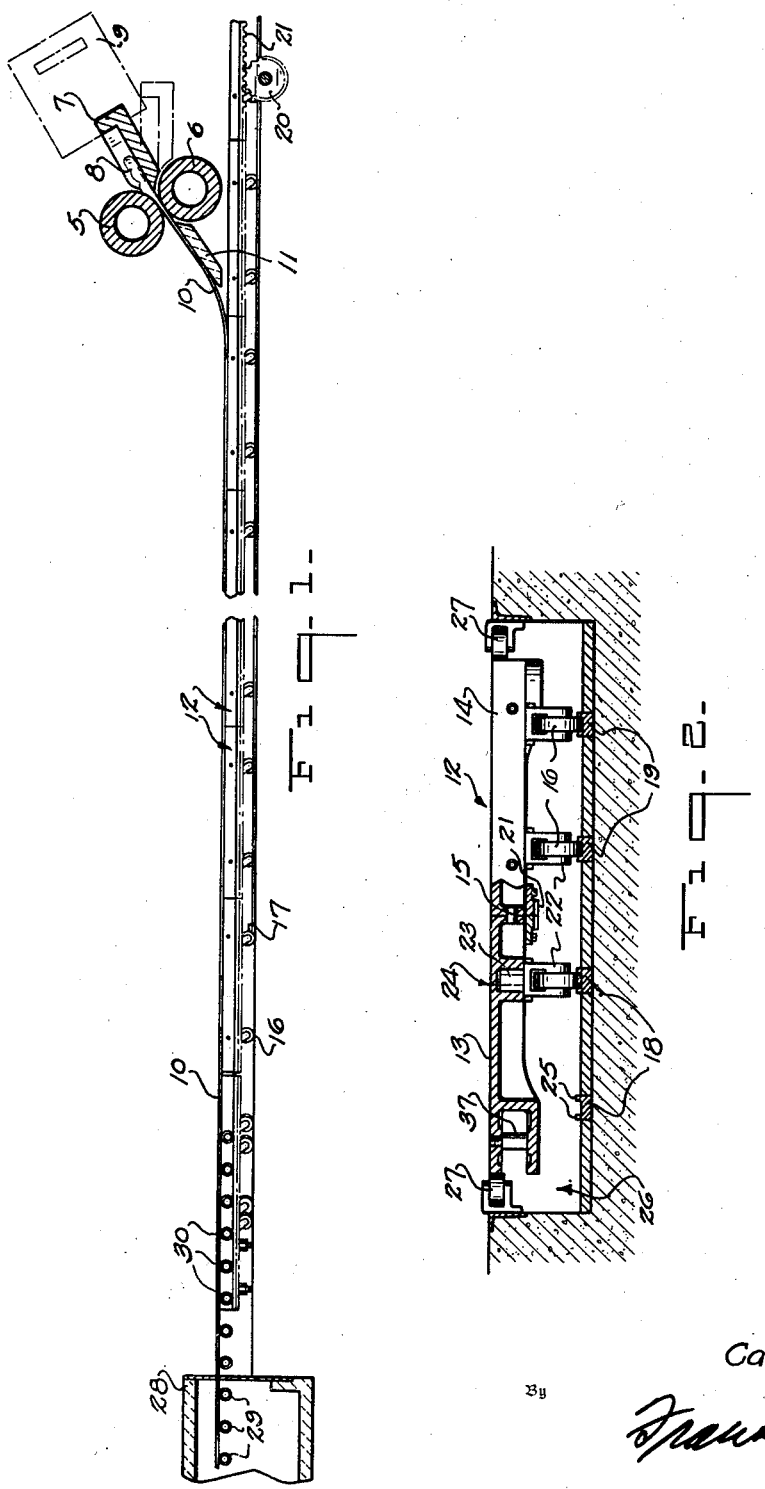
Inventor
Carroll Cone.
By
Frank Fraser
Attorney Inventor
Carroll Cone.

April 18, 1933.  C. CONE  1,904,978
APPARATUS FOR THE MANUFACTURE OF SHEET GLASS
Filed Sept. 10, 1931   3 Sheets-Sheet 3
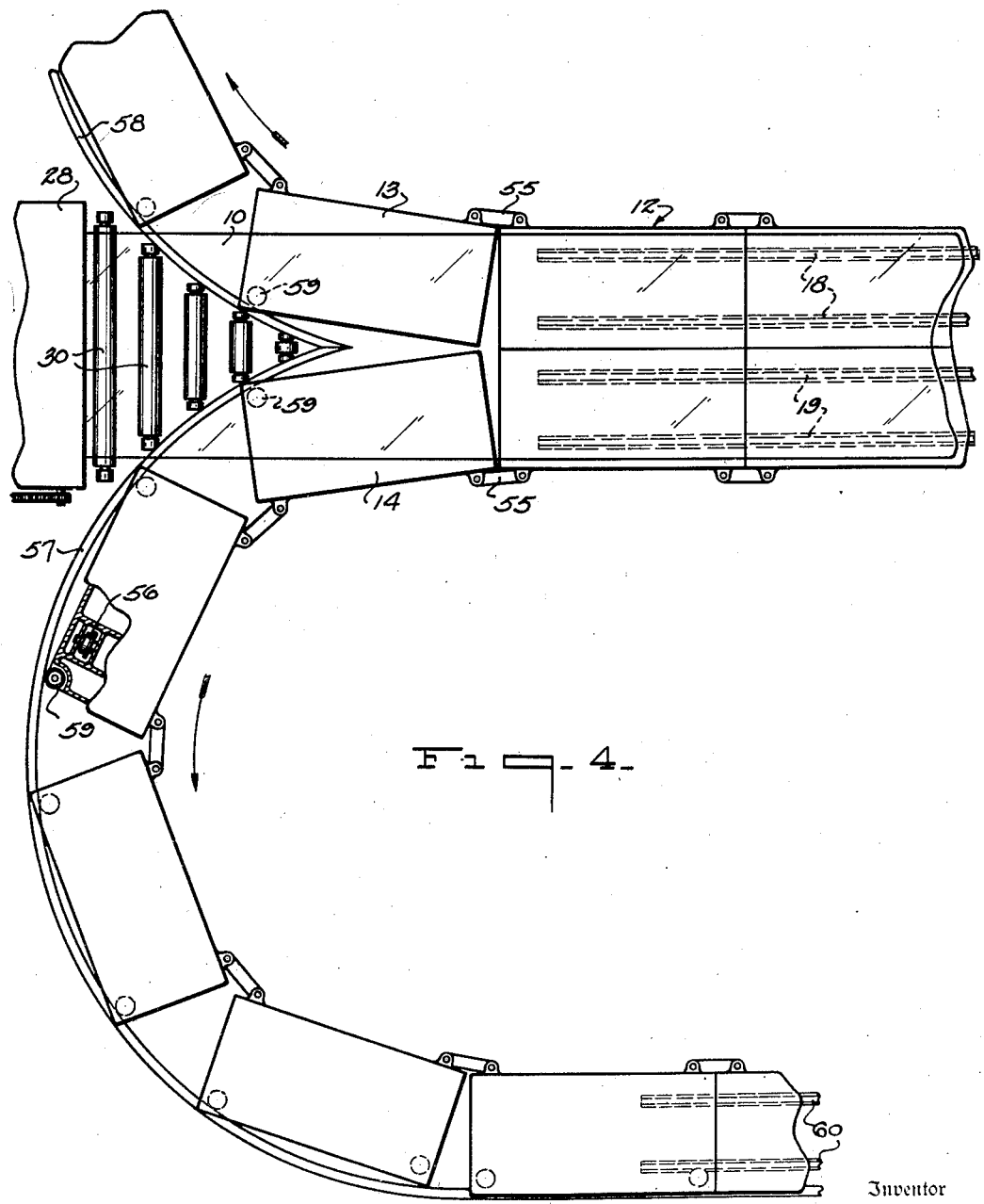
Inventor
Carroll Cone.
By Frank Fraser
Attorney Patented Apr. 18, 1933

1,904,978

UNITED STATES PATENT OFFICE

CARROLL CONE, OF TOLEDO, OHIO, ASSIGNOR TO LIBBEY-OWENS-FORD GLASS COMPANY, OF TOLEDO, OHIO, A CORPORATION OF OHIO

APPARATUS FOR THE MANUFACTURE OF SHEET GLASS

Application filed September 10, 1931. Serial No. 562,118.

The present invention relates broadly to the art of producing sheet or plate glass and more particularly to the formation of successive sheets of glass by an intermittent rolling operation.

In the manufacture of sheet glass according to one well-known process, a mass or charge of molten glass is passed between a pair of rotatable sheet forming rolls and reduced thereby to a sheet of substantially predetermined and uniform thickness, the sheet being received as it is formed upon one or a plurality of horizontally traveling tables, preferably provided with substantially solid unbroken sheet supporting surfaces. The tables then carry the glass sheet to a point opposite the intake end of an annealing leer, whereupon the forward travel of the tables is stopped and the sheet pushed transversely therefrom into the leer by means of suitable stowing tools.

The aim and principal object of the present invention resides in the provision of an improved method and apparatus for effecting the transfer of the semi-plastic sheets of glass from the receiving tables into the annealing leer in a more convenient and efficient manner than heretofore.

Another important object of the invention is the provision of such a method and apparatus as referred to above, whereby the glass sheets may be transferred from the tables into the leer without the necessity of first bringing the said tables to a stop, and also wherein the use of expensive stowing tools is obviated.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through apparatus constructed in accordance with the present invention, Fig. 2 is an end elevation of one of the glass receiving tables, partially in section, Fig. 3 is a partial plan view of Fig. 1, and Fig. 4 is a plan view of an alternative arrangement.

The sheet forming apparatus herein provided comprises a rolling machine including a pair of forming rolls 5 and 6 associated with one end of a tiltable support or receiver 7, and spaced from one another to create a sheet forming pass therebetween. In forming the sheet, a mass or charge of molten glass 8 is deposited upon the receiver 7 from a pot or other suitable receptacle 9, and then passed between the forming rolls which serve to reduce it to a sheet 10 of substantially predetermined and uniform thickness. As it is desirable that the glass sheet be formed at a relatively high rate of speed, the forming rolls 5 and 6 are rotated in a manner to rapidly reduce the mass of molten glass 8 to sheet form.

As the sheet leaves the forming rolls, it passes downwardly over an inclined slab 11 and is deflected into the horizontal plane and received upon a plurality of tables 12, movable forwardly beneath the rolling machine in a definite substantially horizontal path and at a speed preferably equal to or slightly greater than the speed of formation of the sheet.

The tables 12 are arranged end to end in abutting relation so as to form a substantially continuous unbroken surface for supporting the glass sheet. Each table 12 consists of two similar sections 13 and 14, positioned side by side in abutting relation and being connected together by transverse pins 15 so that the said table sections will be caused to move forwardly as a unit. In other words, each table 12 is divided longitudinally into two parts, with the pins 15 being carried by one table section and loosely fitting within openings in the other table section whereby the two table sections may be readily moved apart when desired. Each table section 13 and 14 is supported upon a pair of wheels 16 located adjacent the forward end thereof and also upon a pair of wheels 17 located adjacent its rear end. The supporting wheels 16 and 17 for the table sections 13 and 14 are adapted to run along the parallel tracks 18 and 19 respectively during the receiving of the glass sheet thereupon from the rolling machine. The forward movement of the tables may be effected by means of a drive pinion 20 meshing with a rack bar 21 carried upon the bottoms of the table sections. That is to say, the rack bar may be divided longitudinally, with one part being carried by table section 13 and the other part by table section 14.

The wheels 16 and 17 are associated with the tables in such a manner that they are permitted to freely rotate about a vertical axis relative thereto. Thus, each of the wheels is rotatably carried by a truck 22 provided with a vertical spindle 23 swivelled within a socket 24 in the bottom of the corresponding table section. In order to prevent swivelling of the wheels during the forward movement of the tables along the tracks 18 and 19, the said tracks are substantially U-shaped in cross section as shown in Fig. 2 and the flanges 25 on the rails will prevent turning of the spindles 23 within sockets 24.

The tables are propelled forwardly within a trench or the like 26, and arranged at opposite sides of this trench are idler rollers 27 which engage the outer sides of the tables and serve to hold the table sections 13 and 14 in firm abutting relation during the receiving of the sheet thereupon and until it is desired to effect transfer of the said sheet therefrom.

Positioned in substantial alignment with the rolling machine is an annealing leer 28 having disposed therein a series of horizontally aligned rolls 29 for supporting and conveying the glass sheet 10 therethrough. Arranged forwardly of the intake end of the leer and in alignment with rolls 29 are a plurality of receiving or transfer rolls 30, and it will be seen that these rolls gradually decrease in length from the leer toward the rolling machine. The first two rolls 30 adjacent the leer extend the entire width of the glass sheet and may be positively driven by a suitable chain and sprocket drive 31, while the remaining rolls 30 are preferably idler rolls.

According to the present invention, as the tables 12, carrying the newly formed glass sheet 10, move forwardly and are caused to approach the transfer rolls 30, the table sections 13 and 14 are gradually spread apart as shown in Figs. 3 and 4, with one table section being moved in one direction and the other table section in the opposite direction. In other words, the sections 13 and 14 of each table 12 are moved forwardly and at the same time laterally through an arcuate path, with the result that the said table sections are gradually slid from beneath the glass sheet so that the sheet is gradually transferred, upon continued forward movement thereof, onto the rolls 30 and thence into the annealing leer. As the tables are moved outwardly from beneath the sheet, the rolls 30 provide under-support therefor, with the said under-support for the glass sheet increasing transversely thereof as the supporting area of the tables decreases. In transferring the glass sheet from the tables into the annealing leer in this manner, it is not necessary to first bring the tables to a stop. Moreover, it is unnecessary to change the direction of travel of the sheet in order to feed it into the leer, with the result that the use of expensive stowing tools is obviated.

The means for accomplishing the separation of the table sections 13 and 14 when it is desired to effect transfer of the sheet therefrom may be of the form illustrated either in Fig. 3 or Fig. 4. As shown in Fig. 3, however, there is arranged at either side of the line of tables adjacent the forward end of the leer a star-wheel 32 including a hub 33 loosely mounted upon vertical shaft 34, and from which hub radiate a plurality, and as here shown six arms 35. The outer end of each arm 35 is provided with an open slot 36, and these arms are adapted to engage successive tables when they reach a predetermined position and to effect the separation of the respective table sections. More specifically, when any one table reaches a predetermined point in its forward travel, one of the arms 35 will be so positioned as to receive within the slot 36 thereof a pin 37 carried at the forward outer corner of the respective table section. Associated with each slot 36 is a hook 38 pivoted to the respective arm 35 as at 39. Carried by the hook 38 is a link 40 having pivotal connection with one end of an operating rod 41 which extends through a bearing portion 42 and carries at its inner end a roller 43 engaging cam 44 keyed to shaft 34. Encircling each rod 41 and bearing at one end against the bearing 42 and at its opposite end against a collar 45 carried by said rod is a compression spring 46 which tends to normally urge the said rod inwardly so as to maintain the roller 43 in engagement with cam 44. The star-wheel 32 may be rotated by means of a gear 47 fastened to hub 33 and meshing with and driven from a worm 48 keyed to drive shaft 49.

In operation, the rotation of the star-wheel 32 is adapted to be synchronized with the forward movement of the tables 12 so that as each succeeding table reaches the position where it is desired to effect the separation of the table sections, one of the arms 35 at each side of the table will be positioned so that the pin 37 carried by the respective table section will be received within the corresponding slot 36. As soon as the pin 37 is received within the slot 36, the roller 43 of the corresponding operating rod 41 is adapted to ride down upon the low point 50 of cam 44 whereby to rock the hook 38 about its pivot 39 to engage pin 37. Upon continued rotation of the star-wheel, the table section will be moved through an arcuate path and transferred onto a return track 51 which carries the said table section back to its starting position. At the opposite ends of the tracks 51 there may be provided similar star-wheels for bringing the table sections together upon tracks 18 and 19. The hook 38 releases the pin 37 at the proper time upon riding of the roller 43 upon the high point 52 of cam 44. In order to effect a steadying of the tables during the transfer thereof, each arm 35 is preferably provided with a lateral extension 53 which engages the side of the respective table section.

In the form of the invention illustrated in Fig. 4, the tables 12 are also composed of two similar sections 13 and 14 movable along the tracks 18 and 19. However, in this case, the adjacent table sections are pivotally connected together by links 55. The table sections 13 and 14 are mounted upon wheels 56 which run upon the said tracks 18 and 19. The means for separating the table sections as they approach transfer rolls 30 include the two arcuately curved tracks 57 and 58, and carried by the said table sections and engaging these tracks are guide rollers 59. As the tables approach rolls 30, the guide rollers 59 engaging the arcuate tracks 57 and 58 will cause the table sections 13 and 14 to be moved forwardly and outwardly through an arcuate path in the same manner as described above, whereby to effect the transfer of the glass sheet from the tables onto rolls 30. The table sections may then be returned to their starting position along return tracks 60.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for receiving a newly formed sheet of glass from a forming machine, a plurality of tables movable in relation to the forming machine for receiving the sheet therefrom, each table being composed of two separate sections positioned side by side, the opposed table sections abutting one another throughout their entire length to provide a substantially solid unbroken sheet supporting surface, conveying means located in the projected path of travel of the tables, and means for moving opposed table sections forwardly and also laterally away from one another as they approach said conveying means.

2. In apparatus for receiving a newly formed sheet of glass from a forming machine, a plurality of tables arranged end to end in abutting relation to form a substantially continuous unbroken surface and movable in relation to the forming machine for receiving the sheet therefrom, each table being divided longitudinally into two separate sections positioned side by side, the opposed table sections contacting with one another throughout their entire length, conveying means located in the projected path of travel of the tables, and means for moving opposed table sections simultaneously forwardly and laterally away from one another as they approach said conveying means.

3. In apparatus for receiving a newly formed sheet of glass from a forming machine, a plurality of tables movable in relation to the forming machine for receiving the sheet therefrom, each table being composed of two separate sections positioned side by side, the opposed table sections abutting one another throughout their entire length to provide a substantially solid unbroken sheet supporting surface, means for moving opposed table sections forwardly and also laterally away from one another when they reach a predetermined position whereby to slide them from beneath the sheet, and means providing under-support for the said sheet as the table sections are moved from therebeneath.

4. In apparatus for receiving a newly formed sheet of glass from a forming machine, a plurality of tables arranged end to end in abutting relation to form a substantially continuous unbroken surface and movable in relation to the forming machine for receiving the sheet therefrom, each table being divided longitudinally into two separate sections positioned side by side, the opposed table sections contacting with one another throughout their entire length, means for moving opposed table sections simultaneously forwardly and laterally away from one another when they reach a predetermined position whereby to slide them from beneath the sheet, and means providing under-support for the said sheet as the table sections are moved from therebeneath.

5. In apparatus for receiving a newly formed sheet of glass from a forming machine, a plurality of tables movable in relation to the forming machine for receiving the sheet therefrom, each table being composed of two separate sections positioned side by side, the opposed table sections abutting one another throughout their entire length to provide a substantially solid unbroken sheet supporting surface, conveying means located in the projected path of travel of the tables and increasing in width in the direction of travel of said tables, and means for separating opposed table sections as they approach said conveying means so that they are moved forwardly to a position opposite the conveying means and also outwardly from beenath the glass sheet.

6. In apparatus for receiving a newly formed sheet of glass from a forming machine, a plurality of tables arranged end to end in abutting relation to form a substantially continuous unbroken surface and movable in relation to the forming machine for receiving the sheet therefrom, each table being divided longitudinally into two separate sections positioned side by side, conveying means located in the projected path of travel of the tables and increasing in width in the direction of travel of said tables, and means for separating opposed table sections as they approach said conveying means so that they are moved simultaneously forwardly to a position opposite the conveying means and outwardly from beneath the glass sheet.

Signed at Toledo, in the county of Lucas and State of Ohio, this 8th day of September, 1931.

CARROLL CONE.